(12) United States Patent
Wang et al.

(10) Patent No.: US 7,912,374 B1
(45) Date of Patent: Mar. 22, 2011

(54) HIGH ISOLATION WAVELENGTH DIVISION DEVICES

(75) Inventors: Daoyi Wang, Sunnyvale, CA (US); Yao Li, Fremont, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 1346 days.

(21) Appl. No.: 10/955,057

(22) Filed: Sep. 30, 2004

(51) Int. Cl.
*H04J 14/02* (2006.01)
*G02B 27/14* (2006.01)
(52) U.S. Cl. .......................... 398/85; 359/634
(58) Field of Classification Search .............. 359/634; 398/79, 82, 83, 85
See application file for complete search history.

(56) References Cited

U.S. PATENT DOCUMENTS

7,215,853 B2 * 5/2007 Morita et al. .............. 385/47
2003/0228101 A1 12/2003 Tai
* cited by examiner

*Primary Examiner* — Jack Dinh
(74) *Attorney, Agent, or Firm* — Wuxi Sino IP Agency; Joe Zheng (57) ABSTRACT

Techniques for designing optical devices with high reflection isolation are disclosed. According to one aspect of the devices, an optical filter and a reflecting element are used. Depending on implementation, the reflecting element may be another optical filter, a prism and a mirror. The reflecting element is provided to direct a reflected light beam from the optical filter back to the optical filter for additional filtering, wherein the reflected light is a filtered signal that is presumably carrying residuals of unwanted signals (e.g., a transmitted signal of the optical filter). With a proper placement of the reflecting element with respect to the optical filter, the reflected light beam can be redirected back to the optical filter for a predefined number of times so that the errors or residuals in the reflected light beam are much reduced, if not completely removed.

24 Claims, 8 Drawing Sheets

Prior Art

FIG. 3

Prior Art

FIG. 4

Prior Art

HIGH ISOLATION WAVELENGTH DIVISION DEVICES

BACKGROUND OF THE INVENTION

1. Field of the Invention

The invention is generally related to the area of optical communications. In particular, the present invention is related to optical wavelength multiplexing or add/drop devices with high reflection channel isolation and the method for making the same in compact size.

2. The Background of Related Art

The future communication networks demand ever increasing bandwidths and flexibility to different communication protocols. Fiber optic networks are becoming increasingly popular for data transmission due to their high speed and high capacity capabilities. Wavelength division multiplexing (WDM) is an exemplary technology that puts data from different sources together on an optical fiber with each signal carried at the same time on its own separate light wavelength. Using the WDM system, up to 80 (and theoretically more) separate wavelengths or channels of data can be multiplexed into a light stream transmitted on a single optical fiber. To take the benefits and advantages offered by the WDM system, there require many sophisticated optical network elements.

Optical add/drop and multiplexer/demultiplexer devices are those elements often used in optical systems and networks. For example, an exchanging of data signals involves the exchanging of matching wavelengths from two different sources within an optical network. In other words, an add/drop device can be advantageously used for the multi-channel signal for dropping a wavelength while simultaneously adding a channel with a matching wavelength at the same network node. Likewise, for transmission through a single fiber, a plurality of channel signals are combined via a multiplexer to be a multiplexed signal that eventually separated or demultiplexed via a demultiplexer.

Figure 1A:
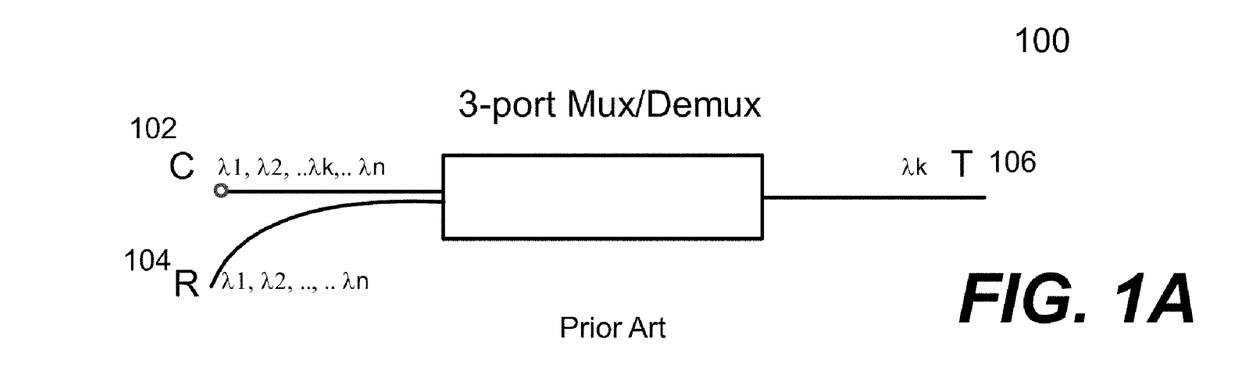
FIG. 1A shows a typical design of a three-port add/drop device.

A fundamental element in add/drop devices and multiplexer/demultiplexer is what is called a three-port device. As the name suggests, a three-port device has three ports, each for a multi-channel signal, a dropped or added signal or a multi-channel signal without the dropped or added signal. FIG. 1A shows a typical design of a three-port add/drop device 100. The optical device 100 includes a common (C) port 102, a reflection (R) port 104, and a transmission (T) port 106. When the device 100 is used as a multiplexer (i.e., to add a signal at a selected wavelength $\lambda_K$ to other signals at wavelengths other than the selected wavelength $\lambda_K$), the T-port 106 receives a light beam at the selected wavelength $\lambda_K$ that is to be multiplexed into a group of beams at wavelengths $\lambda_1, \lambda_2, \ldots \lambda_N$ excluding the selected wavelength $\lambda_K$ coupled in from the C-port 102. The R-port 104 subsequently produces a multiplexed signal including all wavelengths $\lambda_1, \lambda_2, \ldots \lambda_K, \ldots \lambda_N$.

Likewise, when the optical device 100 is used to demultiplex signals, the C-port 102 receives a group of signals with wavelengths $\lambda_1, \lambda_2, \ldots \lambda_K, \ldots \lambda_N$. The T-port 106 produces a signal with the selected wavelength $\lambda_K$ while the R-port 104 subsequently produces a group of signals including all wavelengths $\lambda_1, \lambda_2, \ldots \lambda_N$ except for the selected wavelength $\lambda_x$. In general, the optical paths towards a R-port and a T-port are referred to as R-channel and T-channel, respectively.

Figure 1B:
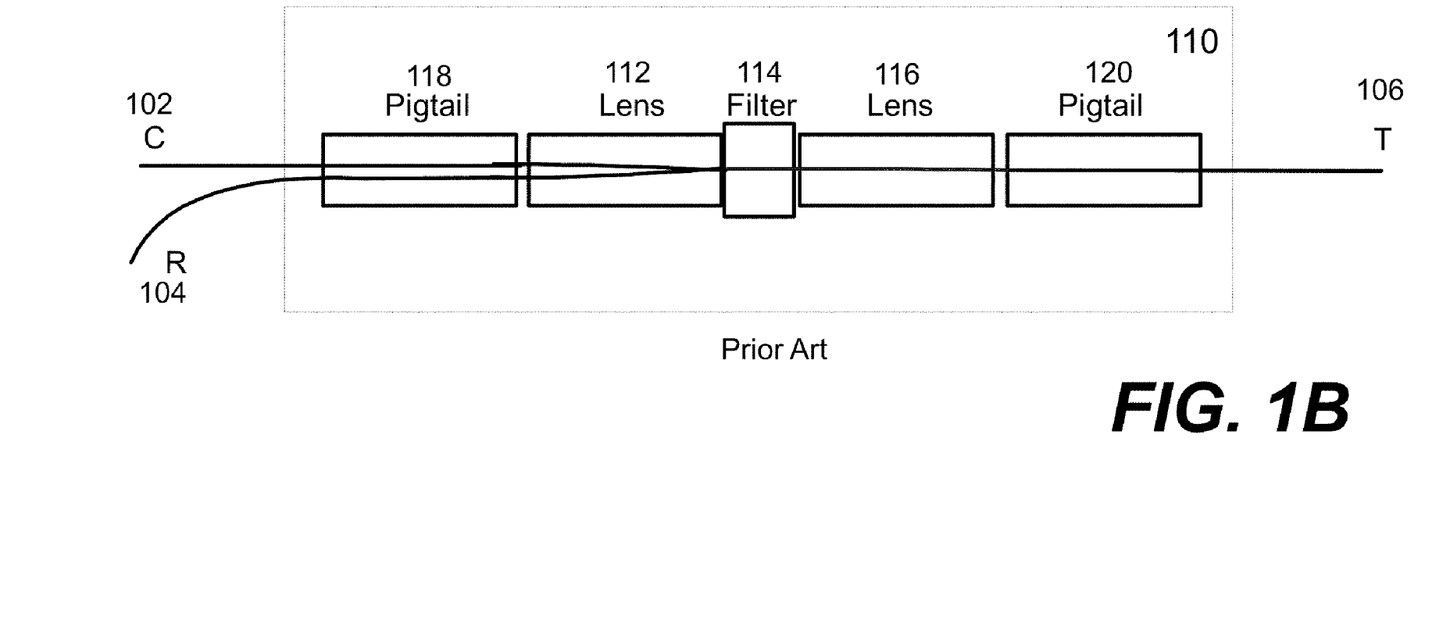
FIG. 1B shows an exemplary internal configuration of the optical device of FIG. 1A.

FIG. 1B shows an exemplary internal configuration 110 of the optical device 100 of FIG. 1A. As shown in FIG. 1B, there is a first GRIN lens 112, an optical filter 114 (e.g., a multilayer thin film filter) and a second GRIN lens 116. In general, a dual-fiber pigtail is provided in a holder 118 (e.g., a dual-fiber pigtail collimator) and coupled to or positioned towards the first GRIN lens 112, and a single-fiber pigtail is provided in a second holder 120 and coupled to or positioned towards the second GRIN lens 116. Essentially the two GRIN lenses 112 and 116 accomplish the collimating means for coupling an optical signal with multi channels or wavelengths in and out of the C port 102, the R port 104, or the T port 106. In general, the three-port device 100 is known to have a very low coupling loss from the C-port to both the R-port and the T-port for use as a demultiplexing device, or vise versa as a multiplexing device.

In general, the optical filters (e.g., thin film filter or TFF) can achieve nearly 100% reflection for the R-channel. For instance, TFF with a reflection index of 99.99% to 99.999% can be routinely achieved and commercially available. This is equivalent to 40 dB to 50 dB isolation for the T-channel from the R-channel. In other words, the mount of residual signal of the R channel transmitted through the TFF and mixed into the T-channel signal is −40 dB to −50 dB of the R-channel signal. The signal exiting the T-port of the 3-port device contains basically the pure T-channel signal, possibly with the R-channel signal residual of −40 dB to −50 dB of its original signal intensity.

Figure 1C:
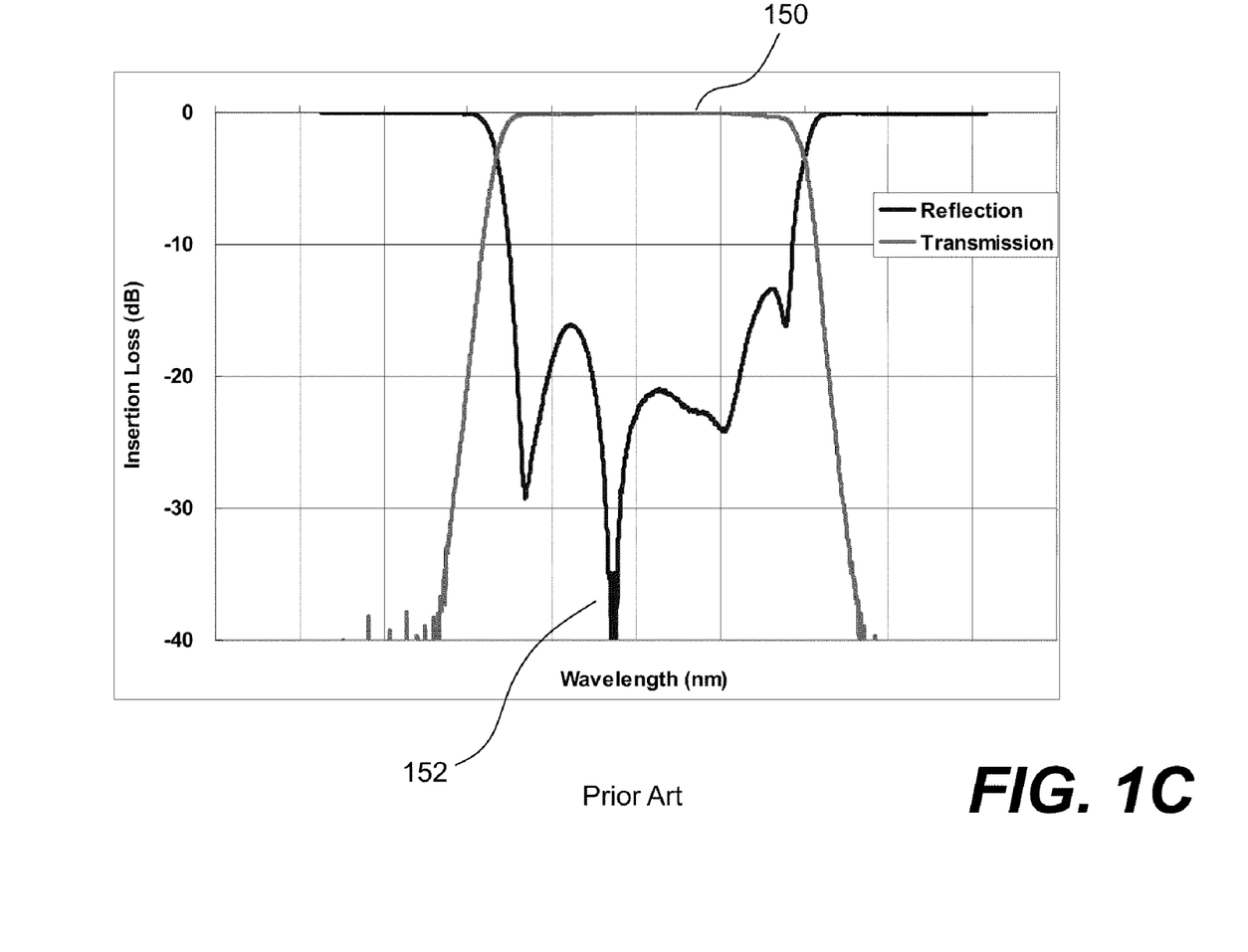
FIG. 1C shows a typical filter spectrum for both R-channel and T-channel.

However, the optical filters by the state-of-art TFF deposition technique can only achieve 97.5% to 99% transmission for the T-channel signal. This is equivalent to 15 dB to 20 dB isolation for the R-channel signal from the T-channel signal. The signal exiting the R-port of the 3-port device contains not only R-channel signal, but also some residual of the T-channel signal that can be of −15 dB to −20 dB of its original signal intensity. As a result, the residual of the T-channel signal would interfere with the R-channel signal, especially when a new signal is added into the transmission fiber that is using the same T-channel optical carrier signal, leading to complexity and difficulty when processing the R-channel signal. FIG. 1C shows a typical filter spectrum for both R-channel and T-channel. The band-pass characteristics 150 for the T-channel is nearly perfect while the band-pass characteristics 152 for the R-channel is far from satisfaction.

Figure 2:
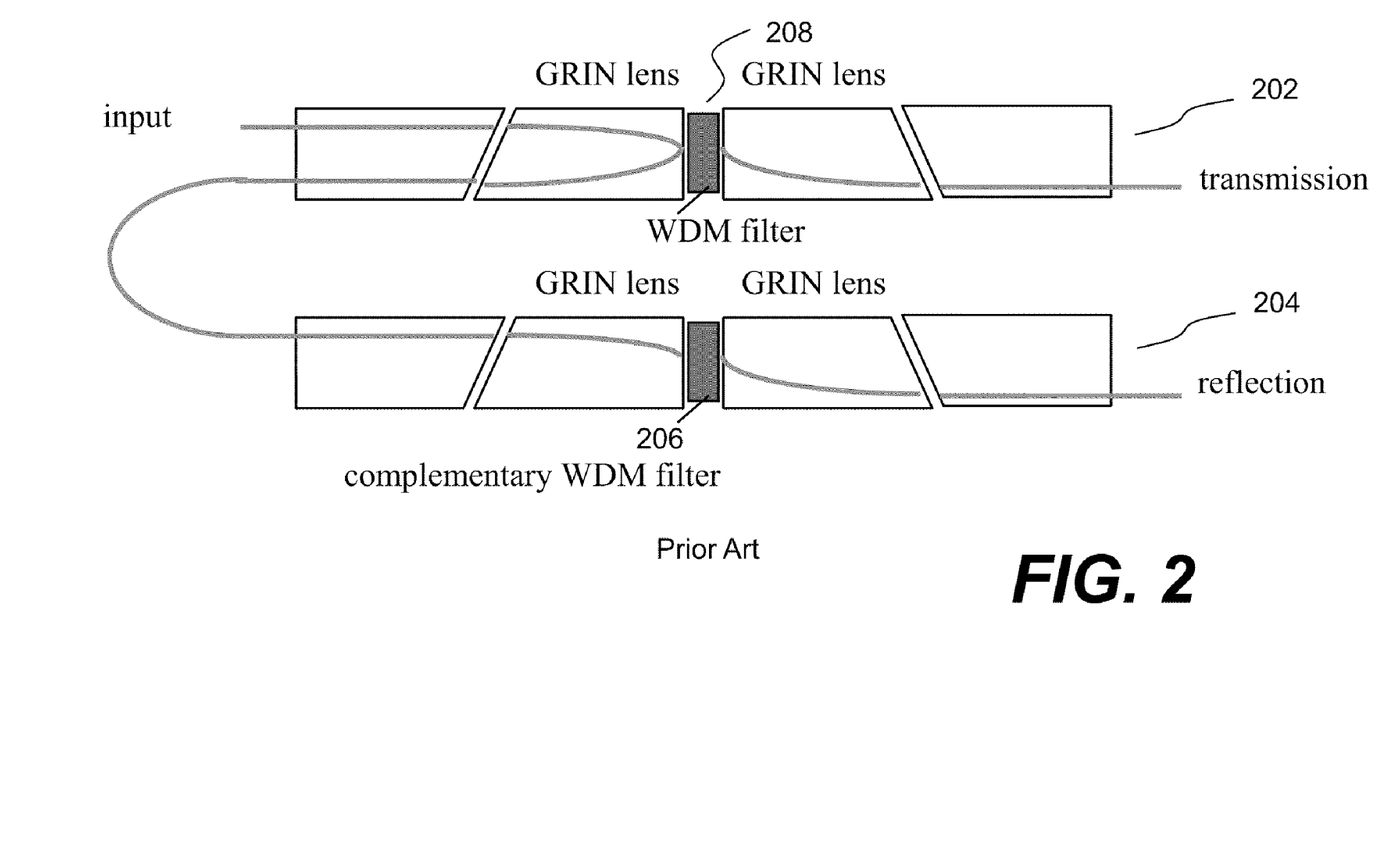
FIG. 2 shows a configuration of two 3-port devices connected in series.
Figure 3:
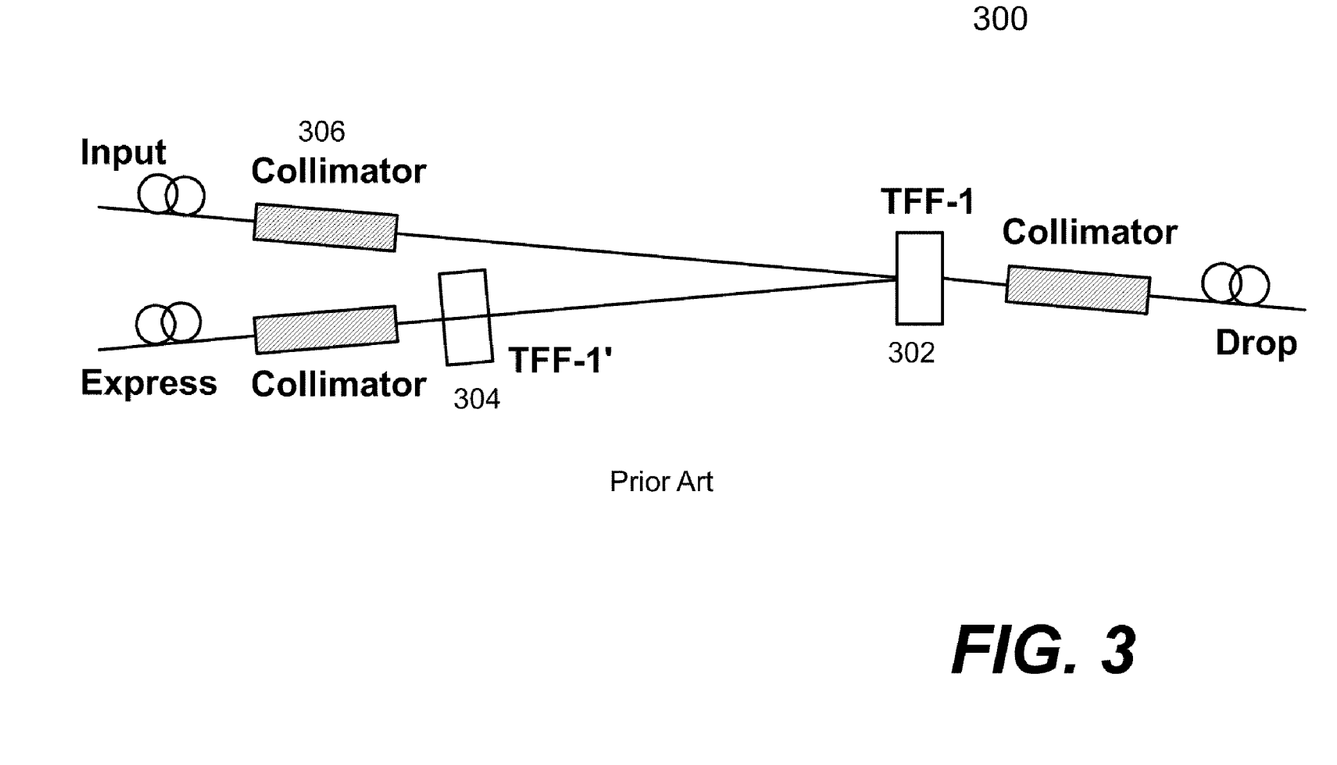
FIG. 3 shows a common approach using a pair of complementary filters with the corresponding spectral characteristics reciprocal to each other to increase the isolation fro the R-channel from the T-channel.

To increase the isolation for the R-channel signal from the T-channel signal, several methods have been used for removing the T-channel signal residual in the R-channel signal. One approach is to cascade two 3-port devices with one of the 3-port devices having a filter of spectral characteristics complementary or conjugate to that of the filter in another one of the 3-port devices. FIG. 2 shows a configuration 200 of two 3-port devices 202 and 204 connected in series. Essentially, the R-channel signal from the 3-port device 202 is coupled to the 3-port device 204 to utilize the band-pass characteristics for the T-channel. In other words, the spectrum characteristics of the optical filter 206 in the 3-port device 324 complementary or reciprocal to that of the optical filter 208 in the 3-port device 202. Evidently, the design 200 is not desirable because of the high cost and bulky size Based on the concept shown in FIG. 2, FIG. 3 shows one of the practical implementation of the above idea. The filters 302 and 304 are deposited with multiplayer coatings to allow transmitting only wavelength λ1 and λ2, respectively. When a light beam including signals at various wavelengths including λ1 and λ2 is coupled by the collimator 306 to the filter 302, a substantial portion of the signal at λ1 passes the filter 302, and at the same time, nearly all the signal λ2 and the residual portion of λ1 are reflected to the filter 304. The reflected light beam then impinges upon the filter 304 that transmits only a signal at λ2. As a result, the signal at λ2 is pure and is isolated from possible interference. Although this approach increases the R-channel isolation, this approach demands stringent assembling tolerance and technical challenge. In addition, the high isolation device build in such way suffers high cost and bulky size.

Figure 4:
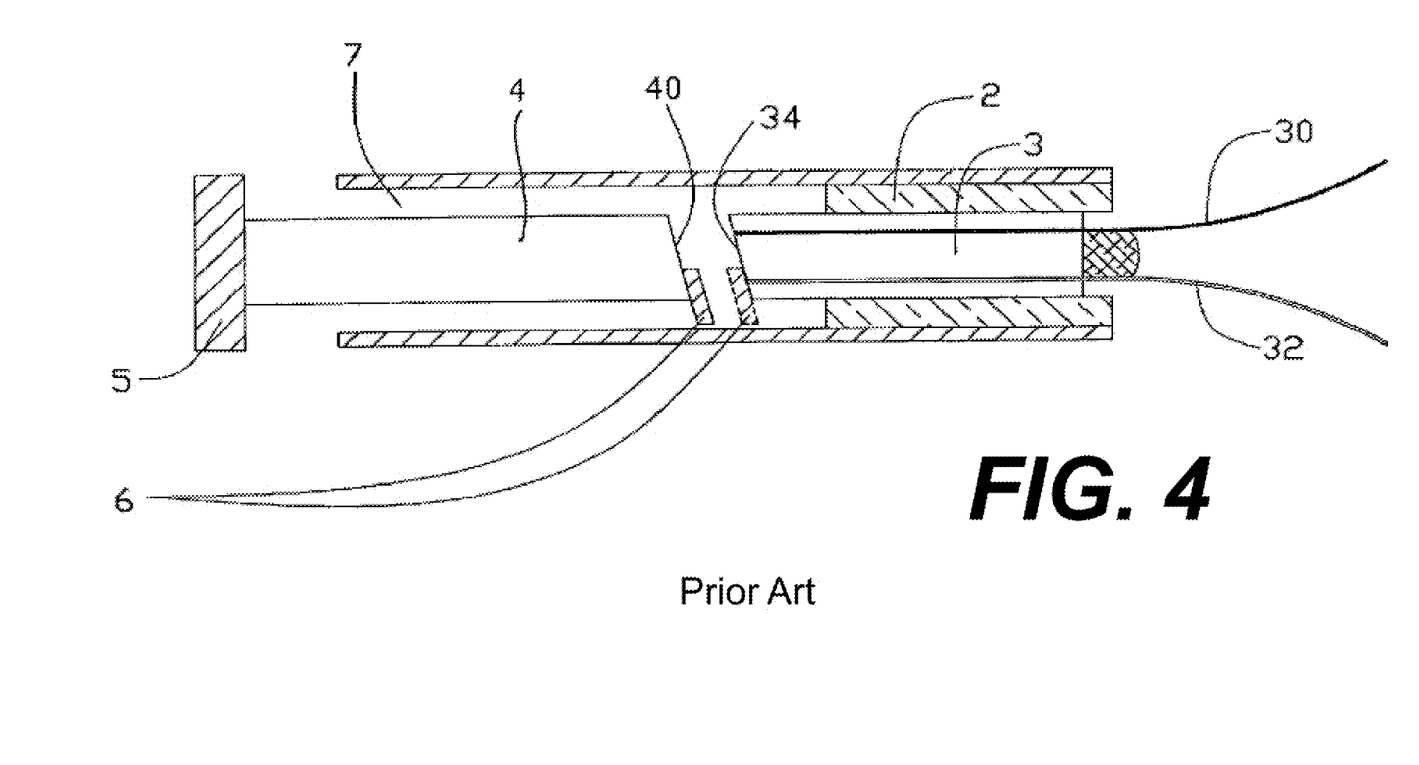
FIG. 4 duplicates FIG. 1 of US Patent Application publication 2003/0228101 in which a filter is attached to an end surface of a fiber or a rear face of a GRIN lens.

US Patent Application publication 2003/0228101 discloses the use of multiple filters in a compact package form. FIG. 4 duplicates FIG. 1 of US Patent Application publication 2003/0228101 in which a filter is attached to an end surface 34 of a second fiber or a rear face 40 of a GRIN lens 4. In operation, an incoming light signal includes two wavelength $\lambda_1, \lambda_2$ and travels from the first fiber 30 through the GRIN lens 4, then reaches the first filter 5. The first filter 5 is designed to just pass a light with a wavelength of $\lambda_1$. The light of wavelength $\lambda_1$ goes through the first filter 5 to reach another device, for example, a single fiber collimator. The light signal reflected by the first filter 5 then goes back through the GRIN lens 4 and reaches the second filter 6. The second filter 6 is designed to just pass a light only with a wavelength of $\lambda_2$. The light of wavelength $\lambda_2$ goes through the second filter 6 and travels along the second fiber 32 to another device for further processing.

In other words, the two filters 5 and 6 are complementary to each other. The second or complementary filter 6 is deposited either on the end facet 40 of the R-channel fiber or the surface 34 of the fiber 32. The film filter deposited there has to be thin enough so that it can be fit into an air gap between the dual fiber pigtail 3 and the R-channel lens 4. The gap thickness is typically in the range of few tens micrometers to a few hundreds micrometers. This approach has the advantage of enjoying the same compact size and reliability as the standard three-port devices. However, the performance is not as desirable as the free-space approach shown in FIG. 3.

Accordingly, there is a great need for techniques for providing high isolation from the T-channel channel such that the errors or residuals to the R-channel are minimized. The devices so designed are amenable to small footprint, broad operating wavelength range, enhanced impact performance, lower cost, and easier manufacturing process.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

In general, the present invention pertains to improved designs of optical devices, particularly for adding or dropping a selected wavelength or a group of wavelengths as well as multiplexing a plurality of signals into a multiplexed signal or demultiplexing a multiplexed signal into several signals. For simplicity, a group of selected wavelengths or channels will be deemed or described as a selected wavelength hereinafter. According to one aspect of the present invention, According to one aspect of the present invention, an optical filter and a reflecting element are used. Depending on implementation, the reflecting element may be another optical filter, a prism and a mirror. The reflecting element is provided to direct a reflected light beam from the optical filter back to the optical filter for additional filtering, wherein the reflected light is a filtered signal that is presumably carrying residuals of unwanted signals (e.g., a transmitted signal of the optical filter). With a proper placement of the reflecting element with respect to the optical filter, the reflected light beam can be redirected back to the optical filter for a predefined number of times so that the errors or residuals in the reflected light beam are much reduced, if not completely removed.

The present invention may be used in many areas such as optical communications and devices. For example, devices designed in accordance with the present invention can be used in applications of fiber to home, where in both the optical network unit (ONU) in a user end, as well as the optical line termination (OLT) in the network transmission end, high isolations between the high intensity video signal and the bi-directional downstream and upstream voice/data signals are highly demanded.

The present invention may be implemented in many ways as a subsystem, a device or a method. According to one embodiment, the present invention is an optical apparatus comprising an optical filter configured to transmits a selected wavelength and reflect all other wavelengths; and a reflecting element so positioned with respect to the optical filter that the optical filter and the reflecting element bounce a light beam back and forth for a predefined number of times, wherein, every time, the light beam impinges upon the optical filter, residuals of the selected wavelength in the light beam are successively reduced to eventually produce a channel signal with much reduced residuals of the selected wavelength.

According to another embodiment, the present invention is method for an optical apparatus, the method comprising providing an optical filter configured to transmits a selected wavelength and reflect all other wavelengths; and positioning a reflecting element with respect to the optical filter that the optical filter and the reflecting element bounce a light beam back and forth for a predefined number of times, wherein the light beam impinges upon the optical filter for the number of times, residuals of the selected wavelength in the light beam are successively reduced to eventually produce a channel signal with much reduced residuals of the selected wavelength.

One of the objects, features, advantages of the present invention is to provide a mechanism of high isolation for the R-channel from the T-channel channel such that the errors or residuals to the R-channel are minimized. The devices so designed are amenable to small footprint, broad operating wavelength range, enhanced impact performance, lower cost, and easier manufacturing process.

Other objects, features, and advantages of the present invention will become apparent upon examining the following detailed description of an embodiment thereof, taken in conjunction with the attached drawings

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENT

The present invention pertains to new designs of optical devices particularly useful for adding or dropping a selected wavelength or a group of wavelengths as well as multiplexing a plurality of signals into a multiplexed signal or demultiplexing a multiplexed signal into several signals. One of the important features in the present invention is to provide a mechanism for high isolation of signals in one optical path from signals in another optical path. In particular, high isolation of the R-channel from the T-channel is provided in devices designed in accordance with the present invention to minimize errors or residuals of the T-channel in the R-channel signals.

According to one aspect of the present invention, an optical filter and a reflecting element are used. Depending on implementation, the reflecting element may be another optical filter, a prism and a mirror. The reflecting element is provided to direct a reflected light beam from the optical filter back to the optical filter for additional filtering, wherein the reflected light is a filtered signal that is presumably carrying residuals of unwanted signals (e.g., a transmitted signal of the optical filter). With a proper placement of the reflecting element with respect to the optical filter, the reflected light beam can be redirected back to the optical filter for a predefined number of times so that the errors or residuals in the reflected light beam are much reduced, if not completely removed. One of the features in the present invention is the underlying flexibility provided to control the predefined number of filtering without blocking any optical paths in optical devices that are amenable to small footprint, broad operating wavelength range, enhanced impact performance, lower cost, and easier manufacturing and adjustment process.

The detailed description of the present invention is presented largely in terms of procedures, steps, logic blocks, processing, or other symbolic representations that directly or indirectly resemble the operations of optical devices or systems that can be used in optical networks. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 5:
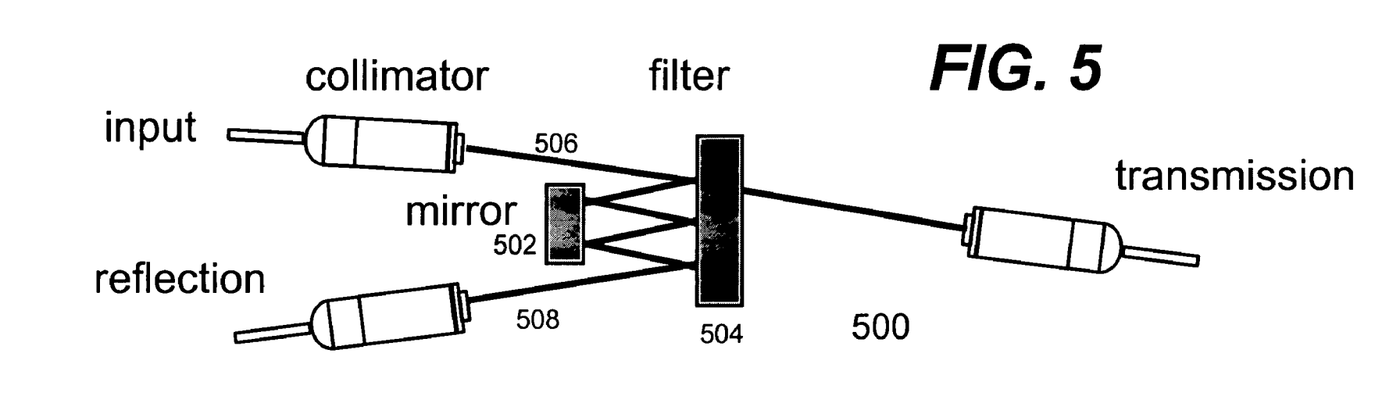
FIG. 5 shows an exemplary design of using multiple reflections to increase reflection channel isolation from the transmission channel.

Referring now to the drawings, in which like numerals refer to like parts throughout the several views. FIG. 5 shows an exemplary design 500 of using multiple reflections to increase reflection channel isolation from the transmission channel. A reflective element 502 (e.g., a mirror) is employed to cause a reflected light beam from the filter 504 to go back to the filter 504 for at least an extra filtering so as to reduce residuals of signals from the transmission channel. A proper placement of the reflective element 502 as shown in FIG. 5 causes two extra filtering of the reflected light beam. Nevertheless, one of the problems with the design 500 is that the reflective element 502 is inserted between two beams 506 and 508. It is generally difficult to hold the reflective element 502 when assembling the part 500. Further, the edge margin to manage the beams to fall within the aperture of the reflective element 502 can be very tight, causing additional difficulties in manufacturing or assembling process.

Figure 6:
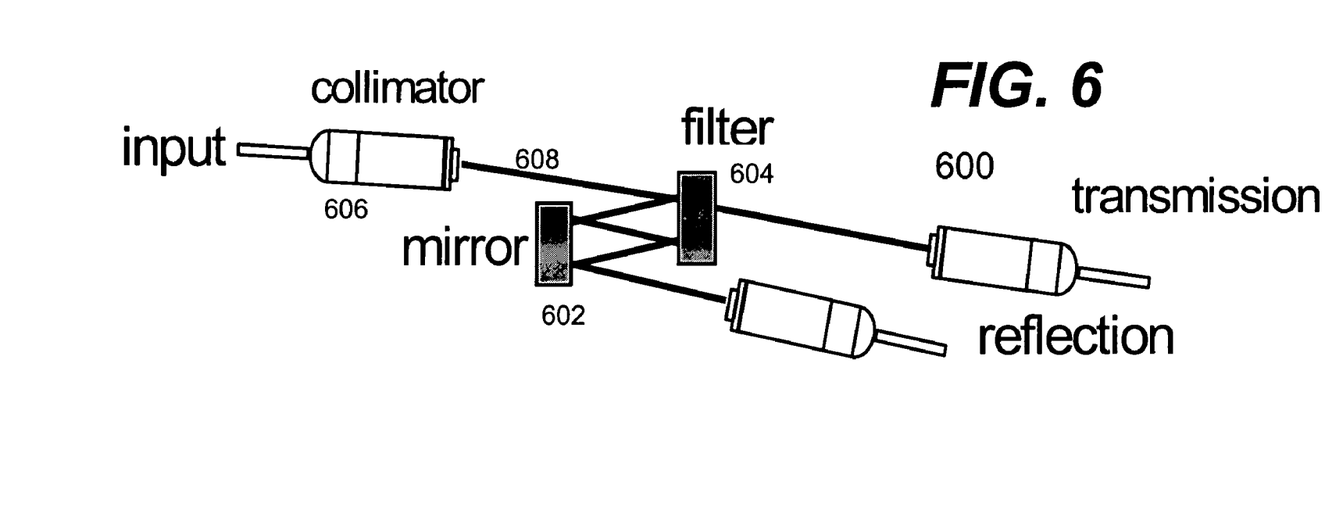
FIG. 6 shows another exemplary design, according to one embodiment of the present invention, of using multiple reflections to increase reflection channel isolation from the transmission channel.

FIG. 6 shows an exemplary design 600, according to one embodiment of the present invention, of using multiple reflections to increase reflection channel isolation from the transmission channel. Different from the design 500 of FIG. 5, the design 600 does not require a reflecting element 602 to be confined between two light beams by directing the reflected light beam to the R-channel that typically includes a collimator.

In operation, it is assumed that an incoming light signal including at least two wavelengths $\lambda_1$ and $\lambda_2$ is coupled by a collimator 606 to a filter 604 (e.g., a thin film filter). The filter 604 is configured or made to transmit the wavelength $\lambda_1$ and reflects all other wavelengths. As a result, a transmitted signal including the wavelength $\lambda_1$ passes the filter 604 to the T-channel that includes a collimator 610, a reflected signal including all wavelengths except for the wavelength $\lambda_1$ is reflected from the filter 604. With a proper incident angle of the collimated light signal 608 to the filter 604, the reflected light beam is directed to the reflecting element 602 that is positioned without blocking the collimated light signal 608.

Depending on a practical need, the reflecting element 602 can be moved near or far from the filter 604. If the reflection characteristics of the filter 604 is not too desirable, a number of reflections may be formed and controlled by moving the reflecting element 602 close to the filter 604. Conversely, a fewer number of reflections may be formed and controlled by moving the reflecting element 602 away from the filter 604. In addition, sizes of the reflecting element 602 and the filter 604 can be extended in one direction (e.g., downwards in FIG. 6) to increase the number of reflections or filtering without blocking any optical path in the device 600.

In any case, after multiple reflections between the reflecting element 602 and the filter 604, the reflection isolation is accumulated to a high desired level. In generally, for two reflections, the isolation is doubled, for triple reflections, the isolation is tripled. After the last reflection on the reflecting element 602, the reflected light beam is coupled out by another collimator 612 that is on the same side of the T-channel.

One of the key features in the present invention is to provide high isolation of the R-channel from the T-channel. As shown in the design 600 and different from the design 500, placing the collimator 612 on the same side of the T-channel, the restrictions on the size and/or placement of the reflecting element 602 are thus removed, making the assembling, manufacturing and adjustment process a lot easier.

Depending on implementation, the reflecting element 602 may be a mirror, a prism or another optical filter whose optical characteristics is substantially similar to that of the filter 604. Given the detailed description herein, it can be appreciated by those skilled in the art that additional filter can be provided when the reflecting element 602 is another optical filter.

Figure 7:
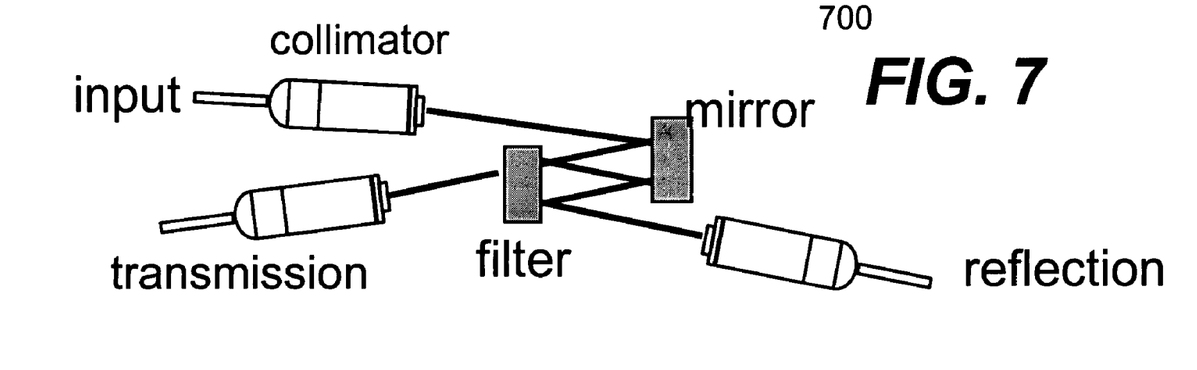
FIG. 7 shows another embodiment that shows an incoming light beam from a collimator impinges upon a mirror first.

The position of the mirror 602 and the filter 604 can be exchanged without affecting the operation of the present invention. FIG. 7 shows another embodiment 700 in which an incoming light beam from a collimator impinges upon a mirror first. The mirror reflects the incoming light beam to a filter that transmits a selected wavelength and reflects all others. Successively, the reflected light beam is bounced between the mirror and mirror, causing the reflected light beam to be filtered again and again till the reflected light falls on a collimator in the R-channel. Consequently, any residuals from the T-Channel are repeatedly reduced, producing a cleaner R-channel signal or increasing isolation of the R-channel signal from the T-channel signal.

Figure 8:
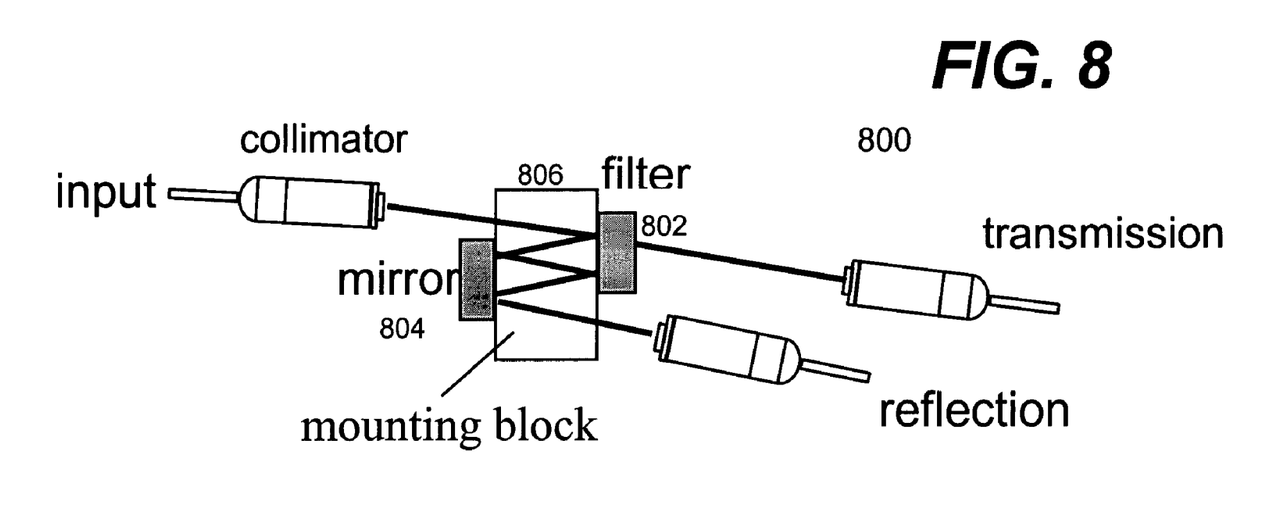
FIG. 8 shows one embodiment in which a filter and a reflecting element are bonded to a mounting block to increase a band isolation level.
Figure 9:
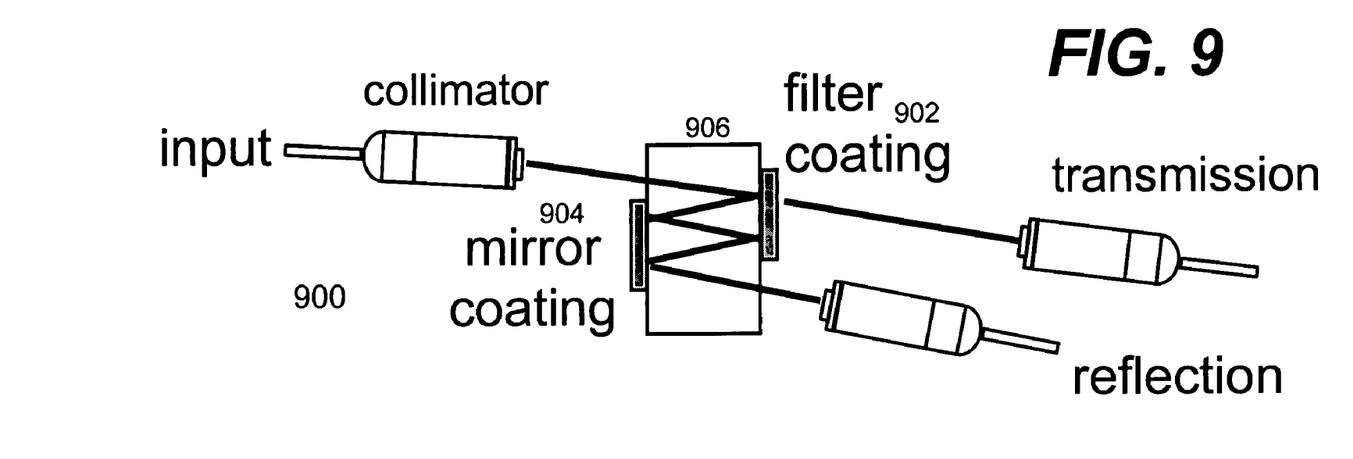
FIG. 9 shows still another embodiment in which a filter and a reflecting element are respectively formed by coating special material(s) right onto proper areas on a glass block.

FIG. 8 shows one embodiment in which a filter 802 and a reflecting element 804 are bonded to a mounting block to increase a band isolation level. The mounting block, preferably pure transparent, may be bonded to a substrate of the device. Alternatively, FIG. 9 shows still another embodiment in which a filter 902 and a reflecting element 904 are respectively formed by coating special materials right onto proper areas on a glass block 906.

Figure 10:
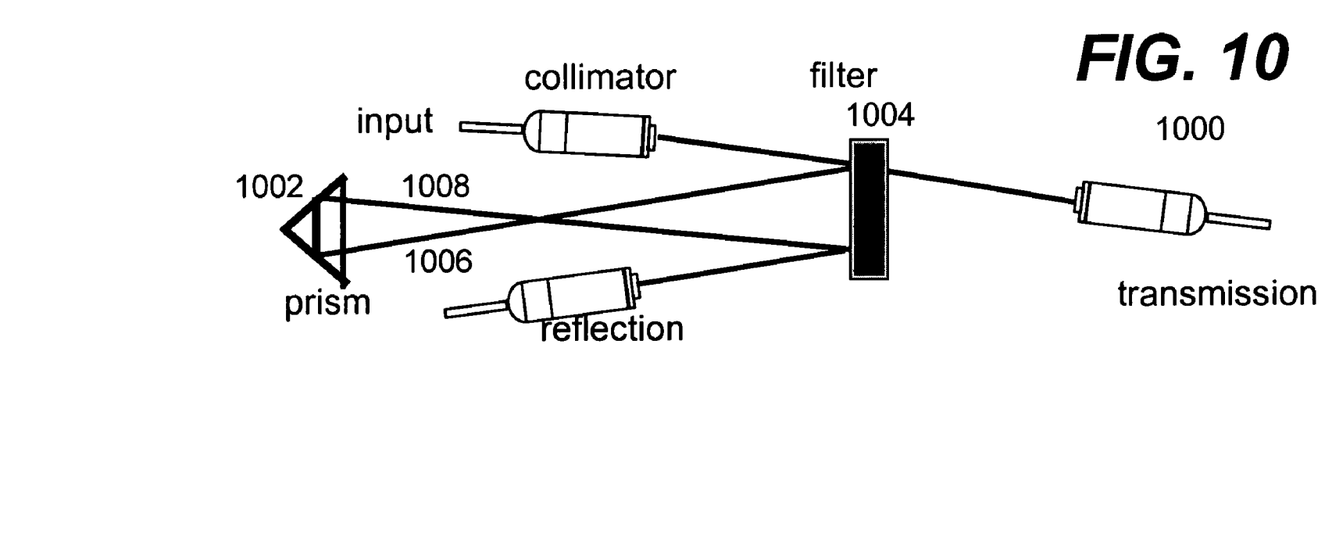
FIG. 10 shows still another embodiment in which a prism is used to redirect beams back to a filter.

FIG. 10 shows still another embodiment 1000 in which a prism 1002 is used to redirect beams back to a filter 1004. In this embodiment, an input beam 1006 and an output beam 1008 of the prism 1002 cross at a specific angle. In other words, with proper designs, a beam shift is provided between the input beam 1006 and the output beam 1008 so that the impinging spot of the filter 1004 can be readily controllable (typically very small), thus effectively utilizing the filter 1004.

The present invention may be implemented in many ways, for example, as an apparatus, a system or a method and provides flexibilities in manufacturing, assembling and adjustment process. According to one embodiment of the present invention, the reflecting element 602 and the filter 604 of FIG. 6 can be inserted or adjusted after all other parts in the design 600 are nearly in place. Both the reflecting element 602 and the filter 604 can be adjusted to control the number of filtering so as to control the level of isolation between the R-channel and the T-channel. As a result, the stringent requirements in assembling such optical devices are much relaxed. In addition, it is appreciated by those skilled in the art that the optical devices so designed in accordance with the present invention are amenable to compact size and lower cost.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. For example, more reflective elements may be added to increase the times that the reflected light beam hits the same optical filter or a plurality of similar type of filters. Accordingly, the scope of the present invention is defined by the appended claims rather than the forgoing description of embodiments.

We claim:

1. An optical apparatus comprising:
    an optical filter configured to transmits a selected wavelength and reflect all other wavelengths; and
    a single reflecting element so positioned with respect to the optical filter that the optical filter and the reflecting element bounce a light beam back and forth for a predefined number of times, wherein the single reflecting element reflects all incoming light, the light beam is caused to impinges upon the optical filter for the predefined number of times, residuals of the selected wavelength in the light beam are successively reduced to eventually produce a channel signal with reduced residuals of the selected wavelength.

2. The optical apparatus of claim 1, wherein the reflecting element is a mirror.

3. The optical apparatus of claim 1, further including a transmission channel and a reflection channel, wherein both of the transmission channel and the reflection channel are located on one side of the optical apparatus.

4. The optical apparatus of claim 3, wherein each of the transmission channel and the reflection channel includes a collimator, and wherein the collimator in the transmission channel is for the selected wavelength, and the collimator in the reflection channel is for the channel signal with much reduced residuals of the selected wavelength.

5. The optical apparatus of claim 4, further including an input collimator providing a light signal including all wavelengths, wherein the optical filter and the reflecting element are positioned amid the input collimator, the collimator for the transmission channel and the collimator for the reflection channel, and wherein sizes of the optical filter and the reflecting element can be extended in one direction without blocking optical paths connecting between any two of the collimators.

6. The optical apparatus of claim 5, wherein the input collimator is on one side of the optical apparatus while the collimator for the transmission channel and the collimator for the reflection channel are on another side of the optical apparatus.

7. The optical apparatus of claim 3, wherein a distance between the optical filter and the reflecting element is adjusted in accordance with the predefined number of filtering by the same optical filter.

8. The optical apparatus of claim 3, wherein sizes of the optical filter and the reflecting element are adjusted in accordance with the predefined number of filtering by the same optical filter.

9. The optical apparatus of claim 3, wherein the optical filter and the reflecting element are bonded respectively to a transparent block.

10. The optical apparatus of claim 3, further including a transparent block coated on both sides thereof with appropriate materials to function as the optical filter and the reflecting element.

11. The optical apparatus of claim 1, wherein the reflecting element is another optical filter whose optical characteristics is substantially close to that of the optical filter.

12. The optical apparatus of claim 1, wherein the reflecting element is a prism optical filter positioned to shift and redirect the light beam back to the optical filter, a beam shift between an original beam spot on the optical filter and a beam spot of re-directing the light beam is so small to effectively utilize a filter coating area of the optical filter.

13. A method for an optical apparatus, the method comprising:
    providing an optical filter configured to transmits a selected wavelength and reflect all other wavelengths;
    positioning a single reflecting element with respect to the optical filter that the optical filter and the reflecting element bounce a light beam back and forth for a predefined number of times, wherein the single reflecting element reflects all incoming light, the light beam is caused to impinges upon the optical filter for the predefined number of times, residuals of the selected wavelength in the light beam are successively reduced to eventually produce a channel signal with reduced residuals of the selected wavelength.

14. The method of claim 13, wherein the reflecting element is a mirror.

15. The method of claim 13, further including positioning a transmission channel and a reflection channel on one side of the optical apparatus.

16. The method of claim 15, wherein a distance between the optical filter and the reflecting element is adjusted in accordance with the predefined number of filtering by the same optical filter.

17. The method of claim 15, wherein sizes of the optical filter and the reflecting element are adjusted in accordance with a the predefined number of filtering by the same optical filter.

18. The method of claim 15, wherein the optical filter and the reflecting element are bonded respectively to a transparent block.

19. The method of claim 15, further including a transparent block coated on both sides thereof with appropriate materials to function as the optical filter and the reflecting element.

20. The method of claim 13, wherein each of the transmission channel and the reflection channel includes a collimator, and wherein the collimator in the transmission channel is for the selected wavelength, and the collimator in the reflection channel is for the channel signal with much reduced residuals of the selected wavelength.

21. The method of claim 20, further including providing from an input collimator a light signal including all wavelengths, wherein the optical filter and the reflecting element are positioned amid the input collimator, the collimator for the transmission channel and the collimator for the reflection channel, and wherein sizes of the optical filter and the reflecting element can be extended in one direction without blocking optical paths connecting between any two of the collimators.

22. The method of claim 21, wherein the input collimator is on one side of the optical apparatus while the collimator for the transmission channel and the collimator for the reflection channel are on another side of the optical apparatus.

23. The method of claim 13, wherein the reflecting element is another optical filter whose optical characteristics is substantially close to that of the optical filter.

24. The method of claim 13, wherein the reflecting element is a prism optical filter positioned to shift and redirect the light beam back to the optical filter, a beam shift between an original beam spot on the optical filter and a beam spot of re-directing the light beam is so small to effectively utilize a filter coating area of the optical filter.

* * * * *